United States Patent Office 3,438,745
Patented Apr. 15, 1969

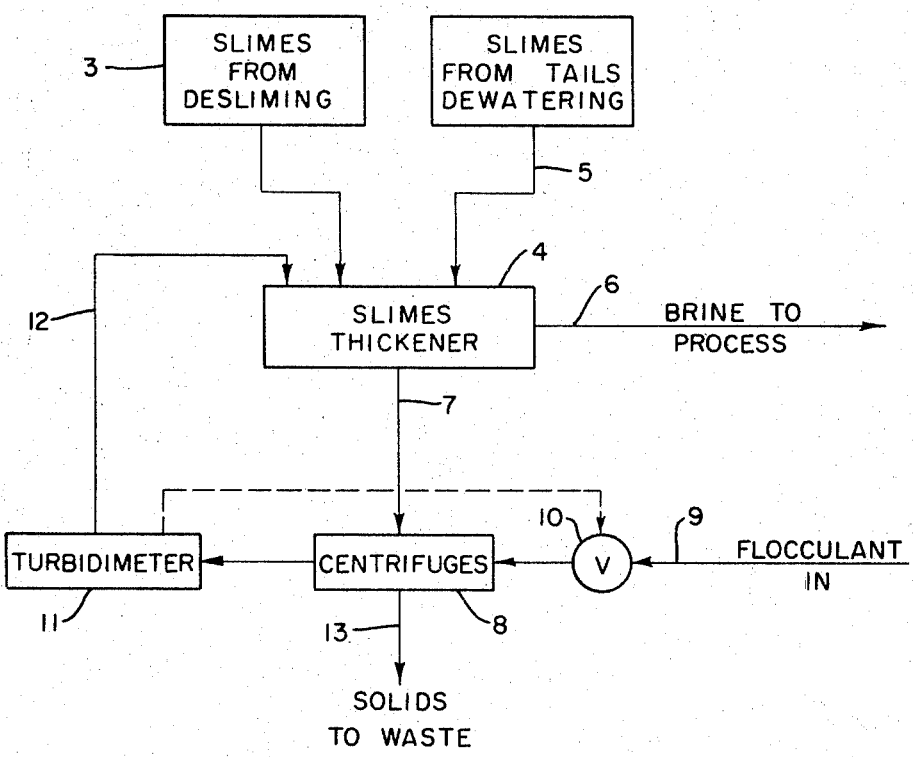

3,438,745
CONTROL OF FLOCCULANT INTRODUCTION TO CENTRIFUGING IN POTASH ORE TREATMENTS
Randal E. Smith, Carlsbad, N. Mex., assignor, by mesne assignments, to Ideal Basic Industries, Inc., Denver, Colo., a corporation of Colorado
Filed Aug. 17, 1965, Ser. No. 480,457
Int. Cl. B01j 9/06
U.S. Cl. 23—312                                 4 Claims

ABSTRACT OF THE DISCLOSURE

A continuous treatment of sylvinite ore in stages, including a regulation of the quantity of flocculant introduction into a centrifuging treatment of thickened slimes of a sylvinite ore treatment for recovery of a clarified brine for use in another stage of the circuit by continuous measurement of turbidity in the centrate discharge of centrifuging, and automatically regulating the input of flocculant to centrifuging to a minimum amount established by measured changes in turbidity of the centrate discharge so as to maintain ad esired uniformity of clarity of the centrate.

---

This invention is directed to an improved method for the treatment of potash ores, and more particularly for the recovery of valuable constituents in the brines associated with clay and fine slimes of the ore, or in clarifying the brines for reuse in the process.

Most potash ores contain fine clay and other minerals which tend to interfere with the separation of potassium chloride from sodium chloride which are the chief constituents. Removal of such fine clay and fines is usually accomplished by washing with brine. Procedures for separating the clay and fines from the potassium chloride (sylvite) and sodium chloride (halite) are well known. They usually involve washing the sized ore with brine, giving a suspension of the clay and fines in brine and leaving a clean washed ore containing the major portion of the sylvite and halite. The clean ore is then subjected to separation methods which may be flotation or recrystallization. The standard practice to recover the brine from slimes has been to thicken and discard the clay sediment as a slurry. Since the clay is generally fine, the thus thickened slurry contains much brine. In order to recover more of this brine, countercurrent decantation has been used in which the slurry is backwashed through several thickeners to replace the brine with water.

A copending application, Ser. No. 426,258, filed Jan. 18, 1965, and assigned to the assignee of this application, describes the use of a centrifuge with a high concentration of flocculant, to separate the clay at a higher density, and therefore recover a major portion of the brine heretofore lost with the discard from the thickener or the countercurrent decantation equipment. This achieves excellent recovery of brine and will reduce the volume of brine required in the system, and reduce the losses incident with handling these brines.

However, the flocculants are expensive and a rather high rate of use is required, so some means was sought to reduce this cost. According to application Ser. No. 426,258, the flocculant is prepared in very dilute solution and added preferably within the centrifuge for maximum effectiveness. Furthermore, a rather definite rate is required to secure settling of the clay and clarification of the brine, for any specific slime slurry. The character of the slime varies, with the character of the ore being handled, with the effectiveness of the desliming procedure, and with steadiness of the operation. To secure settling of the clay and clarification of the brine, therefore, a rate of flocculant addition must be selected that will provide for the heaviest load to be experienced, or continuous attention will be required to change the rate as conditions vary.

This invention is concerned with the economical recovery of this brine from the slimes. Furthermore, to achieve this separation the use of the rather expensive flocculant is required. The present invention is concerned with the control of the rate of flocculant addition. It has been found that the rate of addition can be controlled by measuring the clarity of the centrate and by appropriate instrumentation for adding flocculant to maintain the desired degree of clarity.

It is an object of this invention to provide a simple, economical and efficient control of the rate of flocculant introduction into a centrifuge employed in brine clarification for establishing and maintaining optimum clarification of the brine in such treatment.

Another object of the invention is to provide a continuous selective control of flocculant introduction into a centrifuge employed in brine clarification for establishing and maintaining optimum clarification while holding total flocculant introduction to a minimum over an extended time period, such as a working day.

A further object of the invention is to provide a simple, economical and efficient method of reducing brine losses in the solids discharge of a centrifuge employed in brine clarification.

Still another object of the invention is to provide an efficient system for controlling flocculant introduction into one or a plurality of centrifuges employed in brine clarification.

The practice of the present invention will be descrbied with reference to the accompanying flow sheet showing a portion of the milling circuit of a potash refinery embodying features of the invention. While this invention has a high degree of utility in such a circuit, it should be understood that it may be used effectively wherever turbid brines are introduced into centrifuges for obtaining a liquid-solids separation permitting reuse of brine.

The flow sheet circuit is representative of a portion of the tailings section of a potash refinery treating sylvinite ore and utilizing a flotation separation of the halite and sylvite content of the ore. Such a circuit will employ a desliming treatment in advance of flotation and the slimes separated at such stage may constitute part of the material under treatment. As shown, slimes from a desliming stage 3 are introduced into a slimes thickener 4. Another source of feed to the tailings thickeners 4 in such a circuit is the slimes from a flotation tails dewatering stage introduced into thickener 4 as shown at 5.

The thickener 4 may be of any suitable type and preferably will comprise a tank having an overflow for brine at its top which discharges clarified brine to process as shown at 6, and has a lower sump portion in which settled solids are raked and collected and from which sludge discharges at 7. The sludge discharge is delivered into one or a plurality of centrifuges 8 which separate the liquid and solids. In order to promote the efficiency of the liquid-solids separation, flocculant is introduced into the centrifuges 8 through one or a plurality of lines 9, each having a valve 10 to control the rate or volume of flocculant introduction.

In this circuit, the centrate, which is the liquid discharge of centrifuging, is recycled to the thickener 4 for eventual discharge therefrom as clarified brine. A turbidimeter 11 is installed in the line 12 conducting all, or a portion of the centrate discharged to thickener 4 and directs a signal from line 12 to control valve 10. The flocculant feed rate is established as a theoretical optimum. As the turbidimeter 11 indicates a cloudy centrate, the rate of flocculant introduction is increased and as the centrate becomes clear, the flocculant feed is reduced. Dewatered solids from centrifuges 8 are discharged from the circuit as shown at 13. In operating the centrifuge 8 in an investigation program, the rate of flocculant addition was gradually increased and the character of cake and centrate noted. At low rate very little separation of clay occurred and the cake was very wet. As the rate of flocculant addition was increased, the clay separated from the liquor and the cake became quite heavy and discharged as a heavy mud. At the same time the brine centrate cleared and good operation was secured. The change occurred rather sharply with relatively small change in rate of flocculant addition.

Furthermore, the solids contained varied amounts of fine salts, chiefly halite. These centrifuge easily, but reduce the capacity of the centrifuge to handle clay. On the other hand, they alter the character of the discarged cake, making it easier to handle. With little salt present, the cake is like a clay ball, whereas with increasing salt content it is more fragile and can be sluiced away more easily.

In these operations it was determined that a measure of the recovery of insoluble matter into the cake is a good measure of the efficiency of the system. To show the effect of different feeds, the following data are presented:

| | | | | |
|---|---|---|---|---|
| Gallons per minute feed | 17.7 | 21.5 | 21.7 | 21.4 |
| Percent solids in feed | 17.4 | 8.2 | 15.6 | 10.1 |
| Percent insoluble matter in feed solids | 14.9 | 25.8 | 17.1 | 26.0 |
| Lbs. per minute feed insoluble | 5.1 | 4.7 | 6.4 | 6.0 |
| Parts per million insoluble in centrate | 450.0 | 379.0 | 658.0 | 663.0 |
| Percent recovery of insolubles in cake | 98.5 | 98.4 | 98.0 | 97.8 |
| Percent insolubles in wet cake | 10.4 | 12.9 | 11.0 | 14.5 |
| Dosage, lbs. flocculant required per ton insolubles | 1.6 | 2.9 | 1.7 | 2.4 |

The dosage reported is that required for satisfactory clarity of the centrate and recovery of insolubles in the cake. It will be noted that considerable variation in dosage was required. Since the flocculant is priced at about one dollar per pound, its use needs to be controlled, as a setting of maximum rate would lead to high costs of flocculant.

In the operation, therefore, a recording turbidimeter was placed in the centrate line. In one installation a small portion of the centrate was led to the turbidimeter. In the centrifuging operation at high gravity there is a tendency to disperse air into the centrate. In another installation, a holding tank was used to permit the discharge of the air before feeding to the turbidimeter. Calibration of the turbidimeter was based on gravimetric determinations of the insoluble content of the centrate. In the final installation, the operators were able to secure control with or without deaeration of the pulp. Probably the amount of air introduced was relatively constant.

The signal from the turbidimeter was led to a transmitter which provided the impulse to the valve which controlled the addition of flocculant. As the turbidity increased, the flow of flocculant would increase and as the turbidity decreased, the flow of flocculant would decrease. This secured excellent operation and achieved the desired economy in use of reagent.

One turbidimeter was constructed with a section of pipe in which glass windows were placed so that the centrate flowed between them. An ordinary 40 watt lamp bulb was placed at one end and a photocell placed at the other. This simple arrangement was quite adequate for control. A commercial turbidimeter was also used, which again measured the light transmitted through the centrate. One type of transmitter converted an electrical signal from the turbidimeter to a pneumatic control which then transmitted air at controlled pressure to the actuating device which controlled the valve in the flocculant line. In a system handling 80 tons of insolubles per day, the control of flocculant rate can easily reduce the daily flocculant use by 80 pounds of flocculant, representing a considerable cost reduction.

Other elements of the operation achieved by this control contribute further to its advantage. Without the control, the centrate will at times be quite turbid and will require further clarification before returning to the circuit. Extra flocculant also is objectionable, since most of the effective flocculants tend to make the clay air-avid and the clay therefore tends to float and it becomes very difficult to remove from the centrate. With controlled rates the reagent is quite fully adsorbed by the clay and clarification is effective. With an excess, some may return to the desliming circuits where dispersion of clay is desired and flocculation interferes.

In such circuits, the purpose of the preliminary desliming operation is to remove the clay so that it will not lessen the efficiency of the flotation stage. This desliming is usually accomplished by hydraulic concentration directing the current of brine upwardly through the ore to remove the fine particles of clay and slime. If these particles have been flocculated, they tend to settle and an efficient desliming is not achieved. When the contained slime is sent to the conditioning for flotation, it absorbs the flotation reagent, thereby increasing reagent costs. Consequently, good desliming is economically very important to the operation. As indicated in the flow sheet, the clear brine discharge from the thickener 4 is returned to process and in the recycling of the brine a substantial portion of the brine is conducted through the initial desliming operation. The utilization of the present process before the brine discharge is recycled from the thickener effectively prevents contamination of the brine for later desliming purposes.

The flocculant is normally prepared with the medium of the circuit. With brine systems the flocculant is prepared in brine. A variety of flocculants used as clarification agents for brines may be employed in the treatment and polyacrylamide compositions sold under the trade names "Separan" and "Benefite" are particularly effective. It is advantageous to introduce some water in the preparation so that the brine will be locally undersaturated. This tends to prevent any crystallization on the windows of the turbidimeter. In operations, the turbidimeter has operated for 24 hours with no change in calibration. A water wash at the windows may be desired at intervals. Clay may tend to build up, but did not appear to give trouble in the operations.

The preceding description and the accompanying flow sheet are intended to disclose a circuit found effective in the control of flocculant introduction to the centrifuges, particularly in providing centrate return to the brine circuit in a satisfactory condition for reuse and without excessive or undue flocculant introduction. Changes in circuiting practices and equipment arrangements may be availed of within the spirit and scope of the invention as set forth in the hereunto appended claims.

I claim:
1. In a continuous method of treating potash ores, in which slime slurries formed from dissolving, leaching, desliming or tails dewatering steps are subjected to thickening treatment in a slimes thickener stage, the sludge discharge from the thickening stage is subjected to centrifuging in a next following stage, and a flocculant for insolubles is introduced into the charge of sludge in the centrifuging stage, the improvement which comprises continuously measuring turbidity of the centrate discharge from centrifuging, and automatically regulating the input of flocculant to the centrifuging stage to a minimum amount established by measured changes in turbidity of the centrate discharge and in proportion to the measured turbidity of said centrate discharge so as to maintain a desired uniformity of clarity of the centrate.

2. In a continuous method of treating potash ores, in which slime slurries formed from dissolving, leaching, desliming or tails dewatering steps are subjected to a thickening treatment in a slimes thickener stage, the sludge discharge from the thickening stage is subjected to centrifuging in a next following stage, and a flocculant for insolubles is introduced into the charge of sludge in the centrifuging stage, the improvement which comprises continuously measuring turbidity of the centrate discharge from centrifuging, automatically regulating the input of flocculant to the centrifuging stage to a minimum amount established by measured changes in turbidity of the centrate discharge and in proportion to the measured turbidity of said centrate discharge so as to maintain a desired uniformity of clarity of the centrate, and delivering the centrate discharge as a continuous flow of clarified brine into the slimes thickener stage.

3. In a method as defined in claim 2, delivering the centrate discharge into the thickening stage, and recovering clarified brine from the thickening stage for reuse at another stage of the treatment.

4. In a continuous method of treating potash ores, in which slime slurries formed from dissolving, leaching, desliming or tails dewatering steps are subjected to thickening treatment in a slimes thickener stage, the sludge discharge from the thickening stage is subjected to centrifuging in a next following stage, and a flocculant for insolubles is introduced into the charge of sludge in the centrifuging stage, the improvement which comprises continuously measuring turbidity of the centrate discharge from centrifuging, returning the centrate discharge from centrifuging as clarified brine to the thickening stage, and automatically regulating the input of flocculant to the centrifuging stage to a minimum amount established by measured changes in turbidity of the centrate discharge and in proportion to the measured turbidity of said centrate discharge so as to maintain an optimum turbidity range in the centrate discharge returning to the thickening stage as clarified brine.

References Cited
UNITED STATES PATENTS

| | | | |
|---|---|---|---|
| 3,008,655 | 11/1961 | Adams | 241—20 |
| 3,037,624 | 6/1962 | Jackson | 209—12 X |
| 3,067,133 | 12/1962 | Conley | 210—53 X |
| 3,095,282 | 6/1963 | Wilson | 23—312 |
| 3,137,650 | 6/1964 | Smith | 209—12 |
| 3,145,163 | 8/1964 | Dancy | 209—12 |
| 3,215,509 | 11/1965 | Adams | 209—12 X |
| 3,262,878 | 6/1966 | Beckley | 210—53 |
| 3,282,418 | 11/1966 | Abernathy | 209—12 |
| 3,308,946 | 3/1967 | Mitzmager | 209—172 X |

NORMAN YUDKOFF, *Primary Examiner.*

S. J. EMERY, *Assistant Examiner.*

U.S. Cl. X.R.

23—38; 209—5; 210—51